3,344,333
DEVICE FOR CONTROLLING THE CONTACTORS
OF AN ELECTRIC MOTOR
Pierre Riondel and Jean-Pierre Garnier, Geneva, Switzerland, assignors to Societe Anonyme des Ateliers de Secheron, Geneva, Switzerland
Filed June 15, 1966, Ser. No. 557,697
4 Claims. (Cl. 318—393)

The present invention relates to means for controlling the electropneumatic or electromagnetic rheostat contactors of an electric collector motor, which may be a traction motor or a rolling-mill motor.

The present application is a continuation-in-part of our co-pending application Serial Number 437,253, filed March 4, 1965, and now abandoned, which latter is a continuation-in-part of our abandoned application Serial Number 240,387, filed November 27, 1962.

Public transport enterprises using electric traction vehicles as presently known are characterized by high maintenance cost. For this purpose, it is desirable to replace conventional mechanically actuated contacts by electronic circuits, especially in those cases where frequency of operation is high.

For example, in the case of a trolley-bus having a series-wound motor and a starting rheostat, rheostat variations are carried out by contactors which are successively connected in a given order so as to reduce progressively the resistance of the rheostat as the speed of the trolley-bus increases.

In order to have satisfactory control of the starting current and to lessen the jolts during starting, a relatively great number of contactors must be installed. Moreover, traffic conditions such as short trips, frequent starts and numerous accelerations and decelerations between successive stops, require the contactors to be subjected to intensive work. These factors cause the contacts used in the control circuits of the contactors to be rapidly worn out.

It is an object of the present invention to eliminate this inconvenience by replacing these mechanical control contacts with electronic circuits.

The use of electronics has the additional advantage of facilitating automatic control by reducing the power required by the metering and control elements. This allows, for instance, an acceleration regulation to be achieved which is particularly advantageous for running trolley-busses which are required to start and stop under a wide variety of loads and operating conditions, and also on a wide variety of grades. If an automatic device is used which tends to maintain the starting current constant, acceleration will be quite different, depending upon whether the trolley-bus starts on an upgrade or a downgrade, or empty or filled to capacity. Some starts would consequently be too abrupt and others too slow. By using automatic electronic means which tend to maintain starting acceleration constant, the vehicle can be operated more comfortably and more economically.

The control means according to the present invention comprises a member producing a variable voltage related at least to the speed of a vehicle or a machine driven by an electric collector motor and the working current of the motor, and a series of electronic switches are controlled by this voltage, each controlling one of the contactors and each electronic switch being adjusted to act under the effect of a different voltage.

The attached drawing shows, by way of example, an embodiment of the device according to the invention, corresponding to the case of a traction motor or, more specifically, a starting device for a trolley-bus.

The illustrated device comprises the elements 1 to 8 each of which is built up of well-known basic electrical equipment.

A known differentiator 1 (explained below in detail) receives a voltage $U_v$ which is a function of (for example is proportional to) the speed of the vehicle and forms a current $E_a$ according to the equation $$E_a = k_1 \frac{dUv}{dt}$$

$k_1$ being a constant and $t$ being time. It contains a condenser connected in series between its inlet and its outlet. Current $E_a$ flows through the condenser.

A potentiometer 2, working in well known manner as a linear function generator, supplies a current $E_r$ which is a linear function of the angular position of the driver's pedal.

Figure 5:
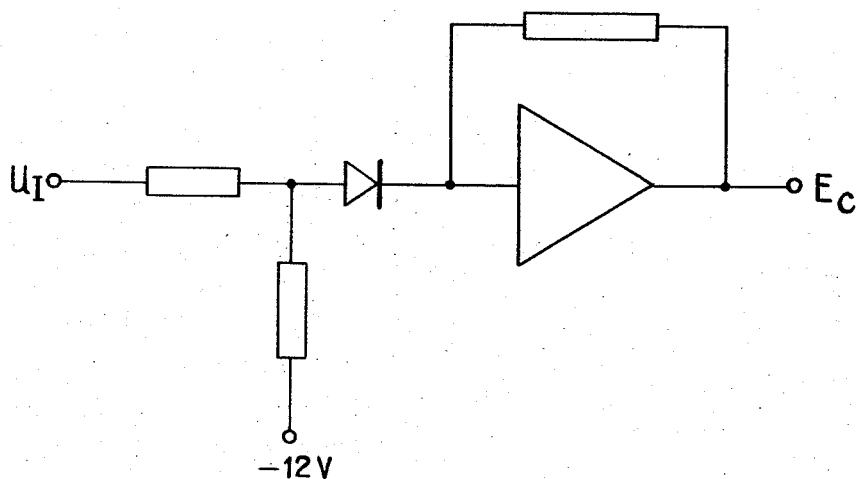
FIGURE 5 shows schematically and by way of example how an element can be built up.

An element 3, receives a voltage $U_I$ which is a function of (for example is proportional to) the current in the motor, and has such a characteristic that output current $E_c$ is first of all zero, then variable and positive along a relatively steep slope for a certain input value of $U_I$. A characteristic of this type can be obtained in well known manner with a Zener diode connected in series (for the unsensitive zone) and a relatively weak resistance (for the slope). This element 3 could also be built up according to FIG. 5. In this case, the amplifier indicated at the right side of FIG. 3 could be that shown in FIG. 2.

An element 4, constituting an algebraic summator amplifier forming $p = E_r - E_a - E_c$, is provided with a series resistor at the inlet and a feed-back resistor between the outlet and inlet. This principle is also well known.

A potentiometer 5, working in well-known manner as a linear function generator, supplies a voltage $E_t$ which is a linear function of the angular position $\alpha$ of the driver's pedal.

An integrator 6 of known construction (explained below in detail) forms the integral of the electrical value $p$ according to the formula $U_c = k_2 \int p\, dt$, $k_2$ being a constant. Furthermore, the voltage $U_c$ cannot exceed the voltage $E_t$ supplied by element 5. This may be accomplished with a diode.

A non-linear element 7 of well-known type (explained below in detail) supplies the control voltage $U_1$ of the first contactor C. This element is composed of an electronic switch whose actuation is determined by a predetermined point of reference.

The non-linear element 8 is identical with element 7, except only for the point of reference which differs. It supplies the control voltage $U_2$ (different from $U_1$) of a second contactor $C_2$.

There may be one or more series of elements such as 7 and 8, each supplying a different voltage for the control of a particular contactor.

The device described herein uses an economic coupling of the contactors to the starting rheostat between a power supply PS and the motor M, inasmuch as each contactor must operate more than once during the same start and for this purpose successive switches act on each other.

With respect to contactors $C_1$ and $C_2$, contactor $C_1$ responds to a voltage $U_c$ of one volt for example, whereas contactor $C_2$ responds to a voltage $U_c$ of two volts. After response of $C_2$, because of the interaction between the two elements 7 and 8, contactor $C_1$ ceases. For it to respond again, the voltage $U_c$ must be increased to three volts, at which time contactor $C_1$ acts on another contactor, etc.

Figure 2:
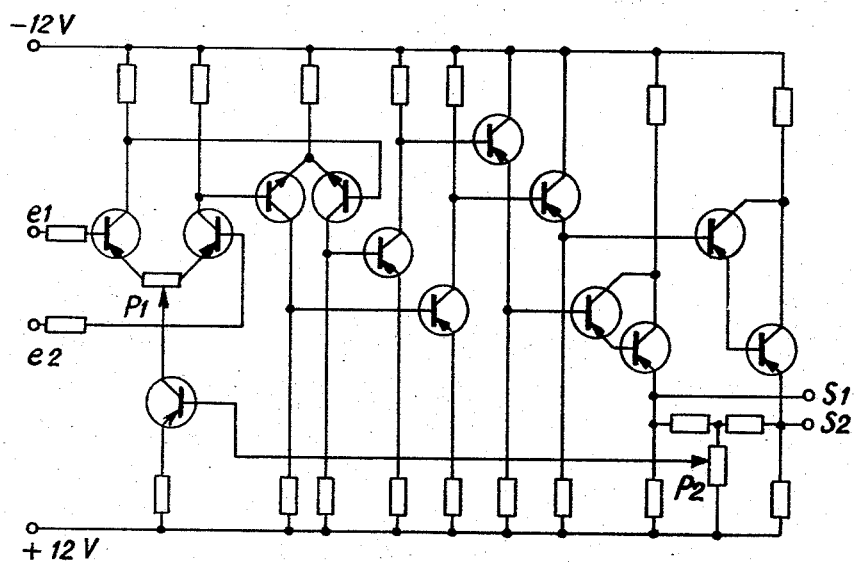
FIGURE 2 shows schematically and by way of example how the differentiator and the integrator can be built up.

FIG. 2 shows schematically how the differentiator 1 and the integrator 6 can be built up. The unit shown in FIG. 2 is an operational amplifier with three voltage amplification steps, the first two steps being differential ones. After said three steps, there are provided push-pull power steps for lowering the exit impedance to the desired level.

This amplifier is attached asymmetrically between one entry ($e_1$ or $e_2$) and the zero point. The other entry is coupled to the zero point by means of an external equilibrium resistance. The exit signals $S_1$ and $S_2$ are symmetrical and in phase opposition. Moreover, $S_1$ is in phase opposition with $e_1$, and $S_2$ is in phase opposition with $e_2$.

Figure 1:
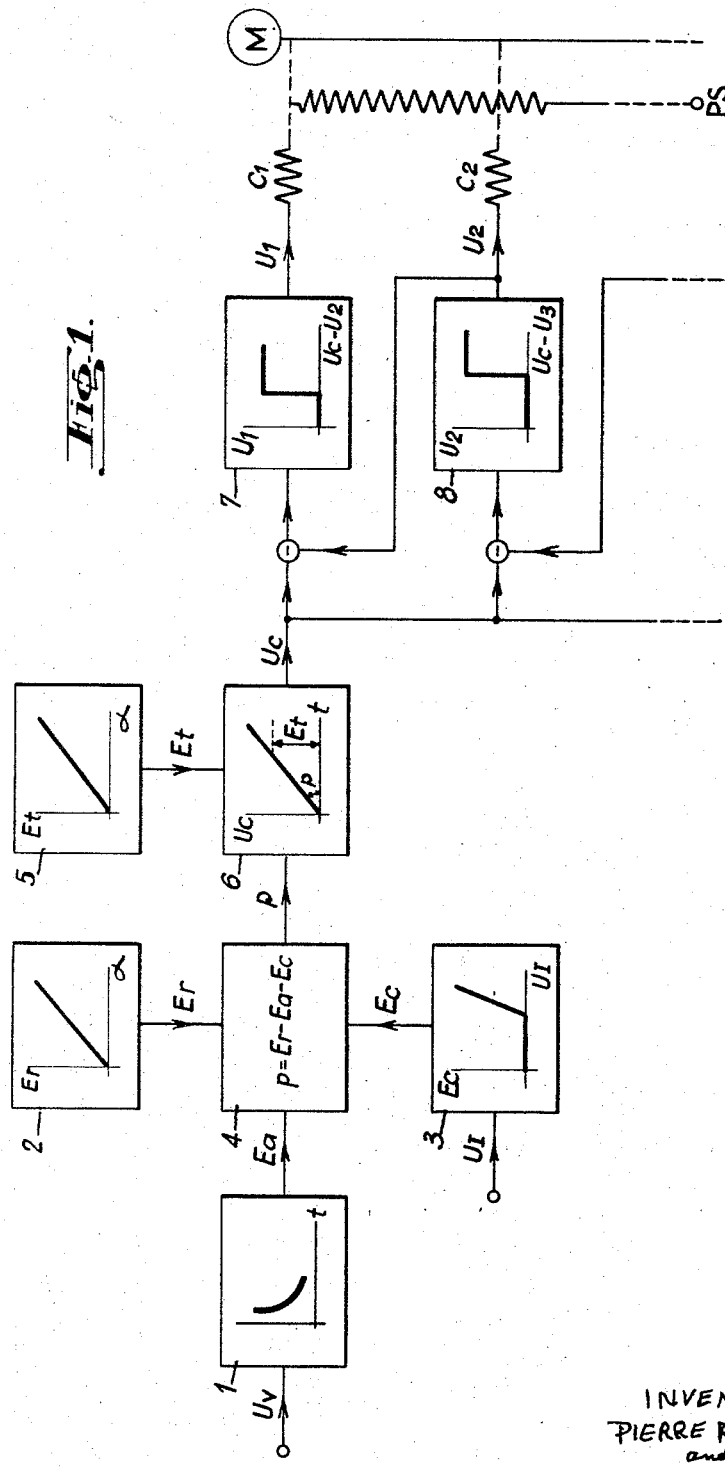
FIGURE 1 shows a schematic block diagram indicating the interconnections of the various units of said embodiment.

Such an amplifier, which is known per se, can be used in known manner for proportional response (P), proportional-differential response (PD), proportional-integral response (PI) or proportonal-integral-differential response (PID). Those skilled in the art will understand that the amplifier shown in FIG. 2 can be used as calculating element, e.g. for addition, inversion, multiplication by a constant, integration and differentiation with respect to time. According to the embodiment shown in FIG. 1, the amplifier of FIG. 2 is used in two different ways, namely as differentiator 1 and as integrator 6. In the latter case, $S_1$ is coupled to $e_1$ over a feedback resistance (not shown).

Figure 3:
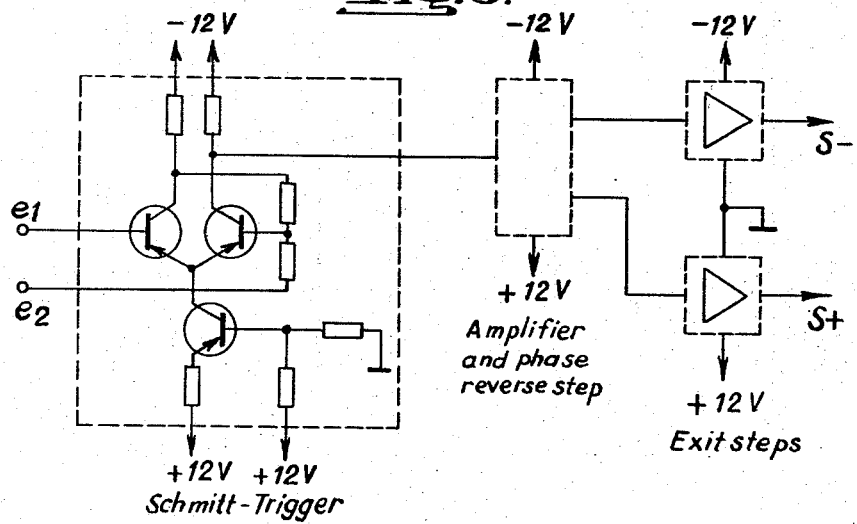
FIGURE 3 shows schematically and by way of example how the non-linear elements can be built up.

FIG. 3 shows schematically how the non-linear elements 7 and 8 can be built. These elements may comprise a Schmitt-trigger, an amplifier such as according to FIG. 2, and phase reverse step, and two exit steps. Such a unit or non-linear element gives an impulse signal when the polarity of the signal between entries $e_1$ and $e_2$ changes. One of the exit steps gives a positive signal S+ and the other exit step gives a negative signal S—.

The entry $e_1/e_2$ has differential character, which means that the switch effect occurs at the moment when the potential difference between $e_1$ and $e_2$ changes its sign. However, entries $e_1$ and $e_2$ are not entirely symmetric, and it is recommended to use $e_1$ as signal entry and $e_2$ as entry for the reference potential. The latter is zero if $e_2$ is connected to the zero-point (mass, ground). In this case, a very weak potential put to entry $e_1$ is sufficient to start the switch operation.

Figure 4:
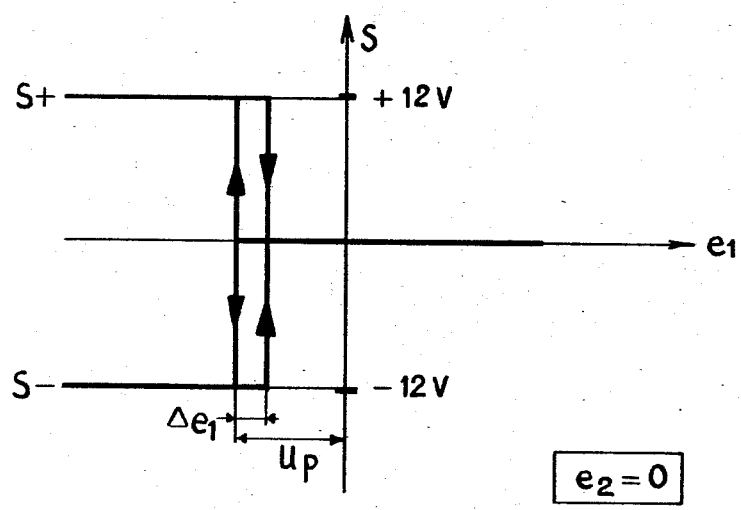
FIGURE 4 shows a characteristic of the nonlinear elements.

FIG. 4 shows a characteristic of such a device for non-linear elements 7 and 8, and it can be seen that the circuit has a hysteresis of $\Delta e_1 \leq 15$ mv., which defines the sensibility of the circuit.

It should be noted that units such as that illustrated in FIG. 3 are well known in the art.

The device described operates as follows:

When the driver depresses the trolley-bus accelerator, the summator 4 is supplied with a voltage $E_r$ proportional to the angular position of the pedal. Derivative $E_a$ being zero, and the speed of the vehicle also being zero, it follows that $p=E_r$. The voltage $U_c$ increases and element 7 commands contactor $C_1$ to respond. At this time, the current is established in the traction motor and a torque is transmitted to the axle. The vehicle thus starts up with a certain acceleration. The value of $p=E_r-E_a$ diminishes since $E_a \neq 0$ and the voltage $U_c$ increases less rapidly. Element 8 then commands contactor $C_2$ to respond. The current in the traction motor increases, and the axle torque as well as the acceleration of the vehicle increases in turn, provoking a progressively weaker increase in the voltage $U_c$ per unit $\Delta t$.

During starts with heavy loads and up steep grades, the current must be relatively great. As the maximum current value permissible in the traction motor should not be exceeded, element 2 intervenes to prevent such. The voltage $E_c$ increases rapidly, in proximity to the maximum permissible current, and the value of $p=E_a-E_c$ becomes becomes zero, which prevents the voltage $U_c$ from going up and thus maintains the notch attained.

The voltage $U_c$ cannot exceed reference value $E_t$, which results in limiting the number of contacts as a function of the position of the driver's pedal.

When the driver releases the pedal, the voltage $U_c$, being limited by $E_t$, instantly follows the latter, provoking a regression along contacts which is proportional to the variation of $E_t$.

The device has been described for the case of acceleration (starting). It is understood that for deceleration (electric braking, the collector motor then working as a generator) the principle remains the same.

It can be seen from the described example that, in principle, the device comprises a member producing a variable voltage $U_c$ and a series of electronic switches controlled by this voltage, these switches controlling the contactors and being adjusted to act under the effect of variable voltages.

In the described example, the member forming the variable voltage $U_c$ is automatic. There could also be such a member, which would be actuated by the person operating the vehicle as a function of the speed of the vehicle and the intensity of the motor's working current, which the operator can observe in the indicating devices on the dashboard.

The invention is not limited to the case of electric traction motors, but can be applied to other uses such as rolling mill motors.

What we claim is:

1. A device for controlling the rheostat contactors controlling the voltage fed to an electric collector motor suitable to power a vehicle, comprising means for producing a variable voltage related at least to the revolution speed of an axis driven by said motor, and a series of electronic switches controlled by said voltage, each of said switches controlling one of the contactors and being adjusted to act under the effect of a different voltage to provide substantially constant acceleration and deceleration of said axis, said means for producing a variable voltage including a first element supplying a voltage dependent upon the position of a vehicle control member, a second element supplying a voltage related to the working current of the motor, and an integrator controlled by the voltages produced by the two aforesaid elements, to maintain its output voltage constant for as long as the work current is greater than a predetermined value and to limit its output voltage to a value proportional to the voltage supplied by the first of these elements.

2. A device according to claim 1, wherein the aforesaid means for producing a variable voltage further includes a third element producing a voltage related to the acceleration of the vehicle, an algebraic summator forming a voltage representing the difference in the voltages supplied by the aforesaid third and second elements, the voltage difference thus formed acting on the integrator.

3. A device according to claim 2, wherein the variable voltage producing means further includes a fourth element producing a voltage related to the position of the aforesaid control member, this voltage acting on said algebraic summator in such a way that the acceleration of the vehicle is a function of the position of this control member.

4. A device according to claim 1, wherein the outlet of one switch is connected to the inlet of the preceding switch to alter the response value of the latter to enable each switch to work under a different voltage according to the operating state of the other switches.

References Cited

UNITED STATES PATENTS

| | | | |
|---|---|---|---|
| 2,452,127 | 10/1948 | James | 318—422 X |
| 3,012,178 | 12/1961 | Barrett | 318—420 X |
| 3,250,944 | 5/1966 | Musick et al. | 318—422 |

ORIS L. RADER, *Primary Examiner.*

G. SIMMONS, *Assistant Examiner.*

UNITED STATES PATENT OFFICE
CERTIFICATE OF CORRECTION

Patent No. 3,344,333　　　　　　　　　　　　September 26, 1967

Pierre Riondel et al.

It is hereby certified that error appears in the above numbered patent requiring correction and that the said Letters Patent should read as corrected below.

In the heading to the printed specification, after line 7, insert -- Claims priority, application Switzerland, Nov. 27, 1961, 13768/61 --.

Signed and sealed this 8th day of October 1968.

(SEAL)
Attest:

Edward M. Fletcher, Jr.　　　　　　　　　　EDWARD J. BRENNER
Attesting Officer　　　　　　　　　　　　　Commissioner of Patents